(12) United States Patent
Xu et al.

(10) Patent No.: US 11,546,330 B2
(45) Date of Patent: Jan. 3, 2023

(54) METHOD AND DEVICE FOR CROSS-DOMAIN STRONG LOGICAL ISOLATION AND SECURE ACCESS CONTROL IN THE INTERNET OF THINGS

(71) Applicant: Tsinghua University, Beijing (CN)

(72) Inventors: Ke Xu, Beijing (CN); Liang Lv, Beijing (CN); Bo Wu, Beijing (CN); Qi Tan, Beijing (CN); Yi Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 226 days.

(21) Appl. No.: 16/958,029

(22) PCT Filed: Nov. 1, 2019

(86) PCT No.: PCT/CN2019/114985
§ 371 (c)(1),
(2) Date: Jun. 25, 2020

(87) PCT Pub. No.: WO2020/220627
PCT Pub. Date: Nov. 5, 2020

(65) Prior Publication Data
US 2021/0218740 A1 Jul. 15, 2021

(30) Foreign Application Priority Data
Apr. 29, 2019 (CN) .......................... 201910354377.X

(51) Int. Cl.
*H04L 29/06* (2006.01)
*H04L 29/08* (2006.01)
(Continued)

(52) U.S. Cl.
CPC ........ *H04L 63/0876* (2013.01); *H04L 9/0833* (2013.01); *H04L 9/0838* (2013.01);
(Continued)

(58) Field of Classification Search
CPC . H04L 63/0876; H04L 9/0833; H04L 9/0838; H04L 9/3273; H04L 63/0236;
(Continued)

(56) References Cited

U.S. PATENT DOCUMENTS 10,924,466 B2 * 2/2021 Biyani .................... H04L 63/08
10,972,463 B2 * 4/2021 Suthar .................... H04L 63/20
(Continued)

FOREIGN PATENT DOCUMENTS

CN 107424066 B * 11/2020 ............. G06Q 40/04
GB 2577751 A * 4/2020 ........... G06F 16/125

*Primary Examiner* — Noura Zoubair
*Assistant Examiner* — Afaq Ali
(74) *Attorney, Agent, or Firm* — Hodgson Russ LLP

(57) ABSTRACT

Embodiments of the present disclosure provide a method and a device for cross-domain strong logically isolation and secure access control in the Internet of Things (IoT). The method includes the following. When one IoT gateway receives the identity authentication request, the IoT gateway sends the identity authentication request to all IoT gateways in the domain excluding that IoT gateway. When all IoT gateways in the domain receive the identity authentication request, all IoT gateways verify separately whether the identity authentication request is legal. After a certain IoT gateway obtains the identity authentication result, a distributed consensus procedure is initiated. The IoT gateways in the domain reach a consensus on the identity authentication result through a distributed consensus mechanism, and the identity authentication result is written and stored to a block of a blockchain.

12 Claims, 6 Drawing Sheets

(51) Int. Cl.

| | |
|---|---|
| *H04L 9/40* | (2022.01) |
| *H04L 9/08* | (2006.01) |
| *H04L 9/32* | (2006.01) |
| *H04L 67/1097* | (2022.01) |
| *H04L 67/12* | (2022.01) |
| *G16Y 30/10* | (2020.01) |

(52) U.S. Cl.
CPC ........ *H04L 9/3273* (2013.01); *H04L 63/0236* (2013.01); *H04L 63/0884* (2013.01); *H04L 63/102* (2013.01); *H04L 67/1097* (2013.01); *H04L 67/12* (2013.01); *G16Y 30/10* (2020.01); *H04L 9/3213* (2013.01); *H04L 9/3247* (2013.01); *H04L 63/12* (2013.01)

(58) Field of Classification Search
CPC ............... H04L 63/0884; H04L 63/102; H04L 67/1097; H04L 67/12; H04L 9/3213; H04L 9/3247; H04L 63/12; G16Y 30/10
See application file for complete search history.

(56) References Cited

U.S. PATENT DOCUMENTS

2018/0212970 A1* 7/2018 Chen ..................... H04L 9/3236
2018/0302222 A1* 10/2018 Agrawal ............... G06F 21/604

* cited by examiner

METHOD AND DEVICE FOR CROSS-DOMAIN STRONG LOGICAL ISOLATION AND SECURE ACCESS CONTROL IN THE INTERNET OF THINGS

CROSS-REFERENCE TO RELATED APPLICATIONS

This application is a US national phase application of International Application No. PCT/CN2019/114985, filed on Nov. 1, 2019, which claims priority to and benefits of Chinese Patent Application No. 201910354377. X, filed on Apr. 29, 2019, the entire contents of which are incorporated herein by reference.

TECHNICAL FIELD

The present disclosure relates to a field of cyberspace security technology, and more particularly, to a method and a device for cross-domain strong logical isolation and secure access control in the Internet of Things.

BACKGROUND

Access control is an important research area in the field of cyberspace security. This technology is designed to prevent unauthorized access to any resource and ensure that computer systems are used legally. According to the definition of the International Telecommunication Union, the Internet of Things (IoT) mainly focuses on the interconnection between things and things, things and people, people and people.

SUMMARY

Embodiments of a first aspect of the present disclosure provide a method for cross-domain strong logical isolation and secure access control in the Internet of Things. The method includes:

S1, receiving, by a target IoT gateway in a domain, an identity authentication request from a host outside the domain packaging the identity authentication request into a release requesting data packet, and broadcasting the release requesting data packet to all IoT gateways in the domain excluding itself;

S2, authenticating by all IoT gateways in the domain the release requesting data packet and generating respective identity authentication results;

S3, once one of the IoT gateways in the domain generates the identity authentication result, initiating a distributed consensus procedure based on a distributed consensus mechanism and obtaining a legal digital string that is in conformity with the distributed consensus mechanism, and sending the identity authentication result and the legal digital string to other IoT gateways in the domain;

S4, when respective IoT gateways in the domain reach a consensus by verifying the identity authentication result and the legal digital string with the distributed consensus mechanism and a node synchronization mechanism, writing and storing the identity authentication result into a new block of a blockchain; and S5, determining, by the target IoT gateway whether the identity authentication result exists by scanning the blockchain that is synchronously updated and stored locally through the node synchronization mechanism, if the identity authentication result exists, sending the identity authentication result to the host, and if the identity authentication result does not exist, continuing the scanning.

Embodiments of the present disclosure provide a device for cross-domain strong logical isolation and secure access control in the Internet of Things (IoT). The device includes a processor, and a memory, configured to store instructions thereon. When the instructions are executed by the processor, the processor is configured to:

when receiving an identity authentication request from a host outside a domain, control a target IoT gateway in the domain to package the identity authentication request into a release requesting data packet, and broadcast the release requesting data packet to all IoT gateways in the domain excluding the target IoT gateway;

control each IoT gateway in the domain to authenticate the release requesting data packet to generate a respective identity authentication result;

after generating the identity authentication result by a first IoT gateway in the domain, control the first IoT gateway to initiate a distributed consensus procedure based on a distributed consensus mechanism and obtain a legal digital string that is in conformity with the distributed consensus mechanism, and send the identity authentication result and the legal digital string to other IoT gateways in the domain;

when respective IoT gateways in the domain reach a consensus by verifying the identity authentication result and the legal digital string through the distributed consensus mechanism and a node synchronization mechanism, control the respective IoT gateways to write and store the identity authentication result into a new block of a blockchain; and control the target IoT gateway to determine whether the identity authentication result exists by scanning the blockchain that is synchronously updated and stored locally through the node synchronization mechanism, when the identity authentication result exists, send the identity authentication result to the host, and when the identity authentication result does not exist, continue the scanning.

Embodiments of the present disclosure provide a non-transitory computer readable storage medium, having instructions stored thereon. When the instructions are executed by a processor, a method for cross-domain strong logical isolation and secure access control in the Internet of Things (IoT) described above is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
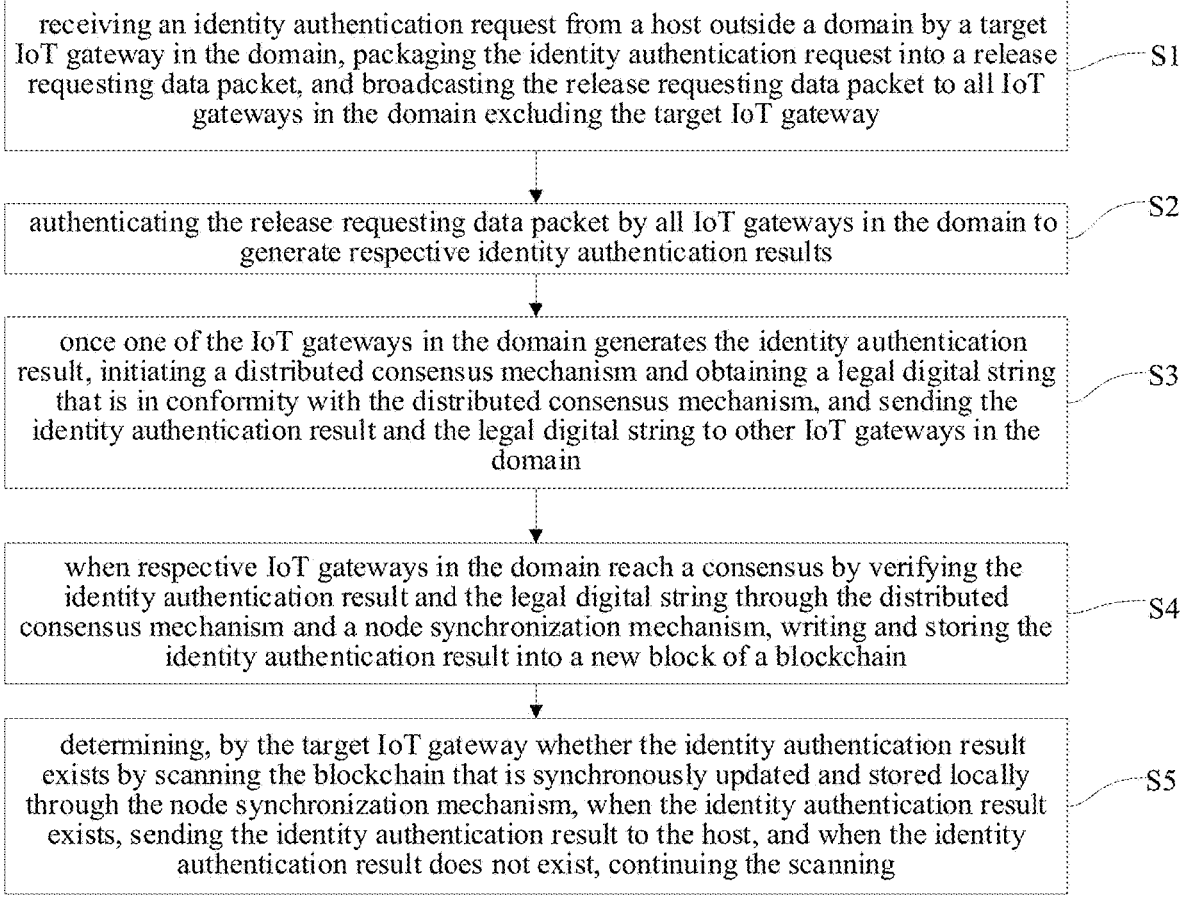
FIG. 1 is a flowchart illustrating a method for cross-domain strong logical isolation and secure access control in the Internet of Things according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the IoT, IoT nodes usually have limited computing power and it is difficult for such nodes to implement complex computing operations and access control. As a result, the risk of hijacking these IoT nodes is high. There are a large number of IoT nodes in the world, such that if a hacker hijacks the IoT nodes, he/she can take advantage of the property of the large number of IoT nodes to implement Distributed Denial of Service (DDoS) attacks, which greatly endanger network security. The IoT nodes are closely related to human life, and usually record people's privacy data. If the IoT nodes are hijacked, it may cause a serious privacy leak. Professor Mattern from the University of Zurich had summarized a series of security issues of the IoT, with particular emphasis on access control issues. Therefore, it is necessary to study the access control mechanism in the IoT.

Recently, with the widespread application of the IoT, there have been a lot of researches on access control in the IoT. Generally, the access control solutions in the IoT can be divided into two aspects. The first aspect is the protocol and framework. Representative developments in this aspect include Extensible Access Control Markup Language (XACML), Access control solutions based on Open Authorization protocol (OAUTH), and User-Managed Access (UMA). The second aspect is the model. Representative developments in this aspect include Role-Based Access Control (RBAC), Attribute-Based Access Control (ABAC), Capability-based access control (CAPBAC), usage control (UCON), and Organizational-Based Access Control (OR-BAC). These solutions enhance the security of the IoT system from various perspectives. Generally speaking, in the above solutions, the access control mechanisms are usually implemented on a single granted node (such as an IoT gateway), and it is usually assumed that this node is trustworthy and secure. However, this assumption is not always true. If the granted node is hijacked, all the devices of the IoT and user data in the domain are at risk. In some solutions, multiple granted nodes are deployed in the domain. However, generally, these granted nodes are backups of each other to improve system reliability. Therefore, if one of the multiple granted nodes is hijacked, the security of identity authentication is greatly threatened. In addition, although the IoT gateway has relatively more computing resources than the IoT nodes, it is still insufficient to implement complex identity authentication processes on the IoT gateways. Thus, it is unpractical to assume that the granted node is secure or trustworthy all the time. In a word, the security of the above access control solution using a single granted node should be improved.

Therefore, the present disclosure provides a method and a device for cross-domain strong logical isolation and secure access control in the Internet of Things, which may overcome shortcomings of the solution based on a single granted node, and have high security, transparency, and traceability.

Now, the method for cross-domain strong logical isolation and secure access control in the Internet of Things according to embodiments of the present disclosure is described below with reference to the drawings.

FIG. 1 is a flowchart illustrating a method for cross-domain strong logical isolation and secure access control in the Internet of Things according to an embodiment of the present disclosure.

As illustrated in FIG. 1, the method for cross-domain strong logical isolation and secure access control in the Internet of Things may include blocks S1 to S5.

In block S1, an identity authentication request from a host outside a domain is received by a target Internet of Things (IoT) gateway in the domain, the identity authentication request is packaged into a release requesting data packet, and the release requesting data packet is broadcasted to all IoT gateways in the domain excluding the target IoT gateway.

In detail, the IoT gateways of the IoT defines the domain. Once one IoT gateway in the domain receives the identity authentication request from the host outside the domain, the IoT gateway may package information carried in the identity authentication request into the release requesting data packet and broadcast the release requesting data packet to all IoT gateways in the domain, to share the information of the identity authentication request.

For example, the IoT consists of five gateways A, B, C, D, and E in the domain. When the IoT gateway A receives the identity authentication request R, the IoT gateway A may package the information carried in the identity authentication request R and send the identity authentication request R to the IoT gateways B, C, D, and E. The five IoT gateways all process the identity authentication request R.

Figure 2:
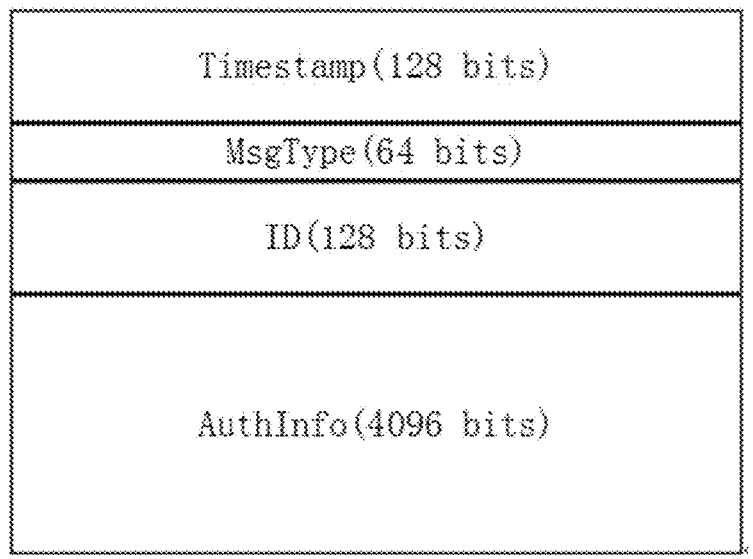
FIG. 2 is a schematic diagram illustrating a release requesting data packet sent by an IoT gateway according to an embodiment of the present disclosure.

As illustrated in FIG. 2, the structure of the release requesting data packet sent by the IoT gateway is provided. The Timestamp field has 128 bits and indicates the time when the message is sent. The MsgType field has 64 bits and indicates the message type. The ID field has 128 bits and indicates a unique code of the IoT gateway that sends the release requesting data packet. The AuthInfo field has 4096 bits and indicates the identity authentication information.

In block S2, the release requesting data packet is authenticated by all IoT gateways in the domain to generate respective identity authentication results.

In detail, once other IoT gateways in the domain receive the release requesting data packet carrying the information of the identity authentication request sent by the target IoT gateway in the domain, the release requesting data packet is authenticated in a preset manner by all IoT gateways to generate respective identity authentication results.

There may be various ways to authenticate the release requesting data packet. As a possible implementation, all the IoT gateways in the domain can extract identity information from the release requesting data packet after receiving the release requesting data packet, and authenticate the identity information based on a legal identity certificate stored locally to generate the identity authentication result.

It should be noted that all the IoT gateways in the domain authenticate the release requesting data packet to generate respective identity authentication results. The identity authentication results may be the same or different. Each IoT gateway has a different computing speed, such that the IoT gateways successively obtain the respective identity authentication results.

For example, according to the above embodiments, all of the five IoT gateways A, B, C, D, and E authenticate the release requesting data packet to generate five respective identity authentication results. The five identity authentication results can be the same or different.

In block S3, once one of IoT gateways in the domain generates the identity authentication result, a distributed consensus procedure based on a distributed consensus mechanism is initiated, a legal digital string that is in conformity with the distributed consensus mechanism is obtained, and the identity authentication result and the legal digital string are sent to other IoT gateways in the domain.

In detail, because of a difference in the computing speed among the IoT gateways, the IoT gateway in the domain that obtains the identity authentication result at first may initiate the distributed consensus procedure to broadcast the obtained identity authentication result to all IoT gateways in the domain excluding itself. Before broadcasting the identity authentication result to other IoT gateways, the legal digital string that is in conformity with the distributed consensus mechanism is obtained, such that the identity authentication result together with the legal digital string are broadcasted to other IoT gateways in the domain.

It should be noted that once the one IoT gateway in the domain generates the identity authentication result and before said IoT gateway in the domain obtains the respective legal digital string that is in conformity with the distributed consensus mechanism, if another IoT gateway in the domain obtains both of the identity authentication result and the legal digital string, the another IoT gateway in the domain may initiate the distributed consensus procedure and send the identity authentication result and the legal digital string to all IoT gateways in the domain excluding itself.

It can be understood that all IoT gateways in the domain obtain the identity authentication result and the legal digital string that is in conformity with the distributed consensus mechanism. The IoT gateway that firstly obtains both of the identity authentication result and the legal digital string may send the identity authentication result together with the legal digital string to the other IoT gateways in the domain.

For example, according to the above embodiments, all of the five IoT gateways A, B, C, D, and E generate the respective identity authentication results. In an example, the IoT gateway C is the first one who obtains the identity authentication result. The IoT gateway C may obtain the legal digital string. When the obtaining of the legal digital string by the IoT gateway C is completed, none of the other four IoT gateways complete the obtaining of the legal digital string, then the IoT gateway C may initiate the distributed consensus procedure and send the identity authentication result and the legal digital string generated by the IoT gateway C to the other four IoT gateways A, B, D and E in the domain by broadcasting.

As another example, all of the five IoT gateways A, B, C, D, and E generate the respective identity authentication results. In an example, the IoT gateway C first obtains through generation the identity authentication result. However, during obtaining the legal digital string by the IoT gateway C, the IoT gateway E first obtains the legal digital string that conforms to the distributed consensus mechanism before the IoT gateway C does, after generating the identity authentication result, then the IoT gateway E may initiate the distributed consensus procedure and send the identity authentication result and the legal digital string generated by the IoT gateway E to the other four IoT gateways A, B, C, and D in the domain by broadcasting.

Figure 3:
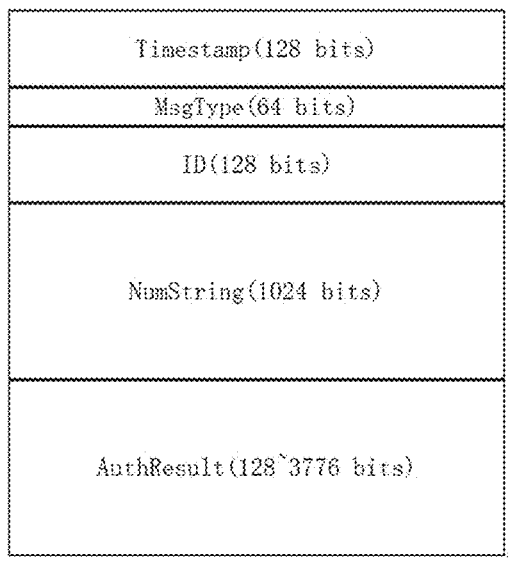
FIG. 3 is a schematic diagram illustrating broadcasting a data packet of an identity authentication result according to an embodiment of the present disclosure.

As illustrated in FIG. 3, a structure of a broadcast data packet sent by the IoT gateway where the authentication is completed and the legal digital string is obtained is provided. The broadcast data packet includes the identity authentication result and the legal digital string. The Timestamp field has 128 bits and indicates the time when the message is sent. The MsgType field has 64 bits and indicates the message type. The ID field has 128 bits and is used to indicate the unique code of the IoT gateway that sends the broadcast data packet. The NumString field has 1024 bits and indicates the legal digital string that is in conformity with the distributed consensus mechanism and obtained by the IoT gateway. The AuthResult field indicates an authentication result and a length of the AuthResult field is variable, which is not less than 128 bits and not more than 3776 bits. AuthResult field is used to indicate the identity authentication result obtained by the IoT gateway.

In block S4, when respective IoT gateways in the domain verify the identity authentication result and the legal digital string with the distributed consensus mechanism and a node synchronization mechanism to reach a consensus, the identity authentication result is written and stored into a block of a blockchain.

It may be understood that after the identity authentication result and the legal digital string are obtained by each IoT gateway, both of the identity authentication result and the legal digital string are verified using the distributed consensus mechanism and the node synchronization mechanism. The identity authentication result is approved only after the verification is passed.

There are various types of distributed consensus mechanisms. The distributed consensus mechanism used in the present disclosure is not limited. The blockchain has its own node synchronization mechanism. Each node can unify the respective blockchain for storage with respect to each other through the node synchronization mechanism. The synchronization mechanism used by different blockchain systems may be different. The node synchronization mechanism used by each blockchain system is not limited. For example, initial block download (IBD) synchronization mechanism in the Bitcoin blockchain can be adopted. Other node synchronization mechanisms can be used.

Figure 4:
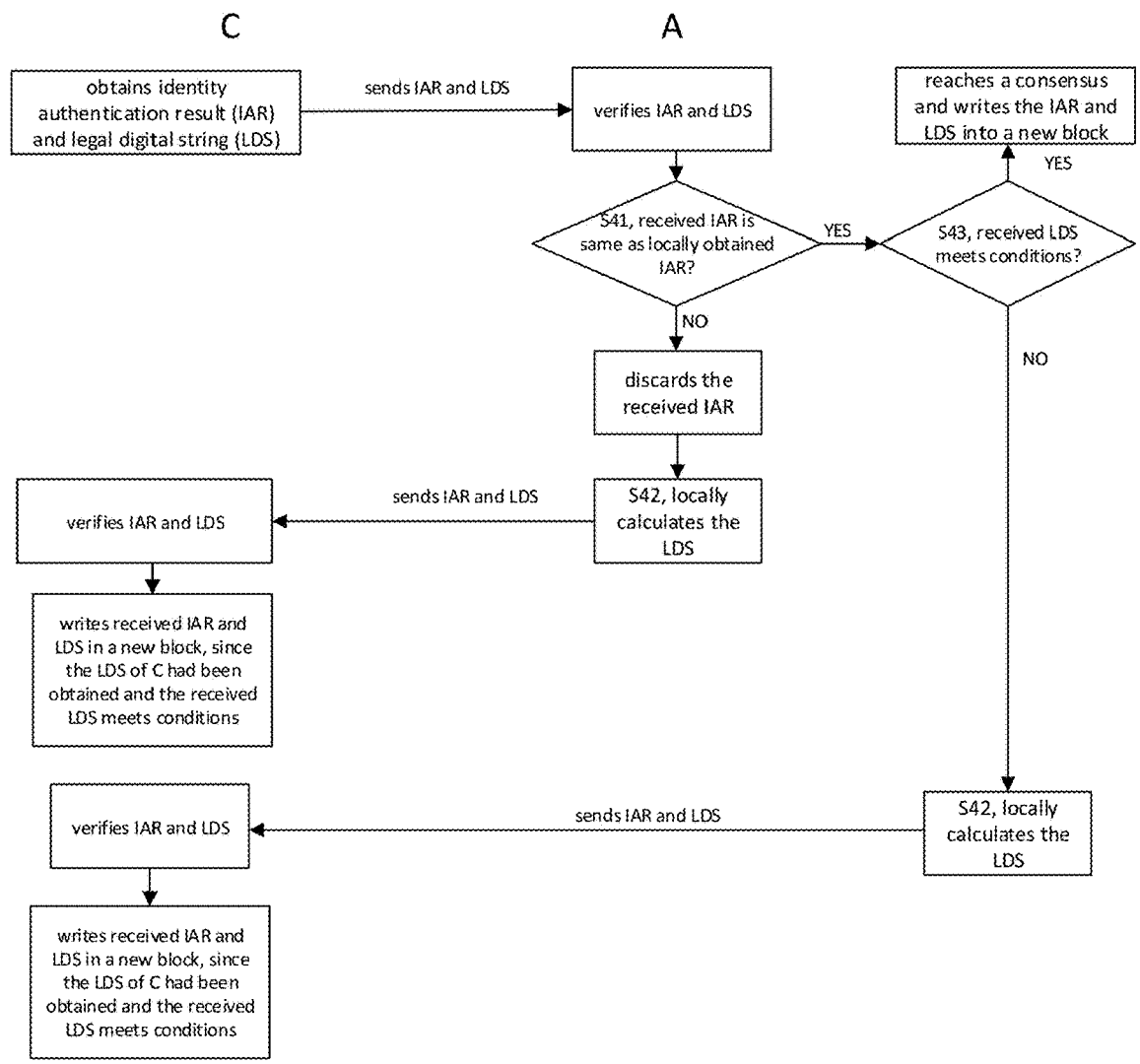
FIG. 4 is a flowchart illustrating a method for cross-domain strong logical isolation and secure access control in the Internet of Things according to another embodiment of the present disclosure.

As a possible implementation, the distributed consensus mechanism may adopt a Proof of Work (PoW) method. As illustrated in FIG. 4, the block S4 may include the following.

In block S41, each IoT gateways in the domain determine whether the received identity authentication result is the same as the identity authentication result generated by the respective IoT gateway. When the received identity authentication result is different to the identity authentication result generated by the respective IoT gateway, the identity authentication result is disproved and discarded, and the block S42 is executed. When the received identity authentication result is the same as the authentication result generated by the respective IoT gateway, a block S43 is executed.

In block S42, the legal digital string that is in conformity with the distributed consensus mechanism is obtained. After the obtaining is completed, the distributed consensus procedure is initiated, the identity authentication result of the IoT gateway and the legal digital string of the respective IoT gateway are sent to all other IoT gateways in the domain, and the block S41 is executed.

In block S43, it is determined whether the legal digital string is in conformity with the condition specified by the distributed consensus mechanism. When it is determined that the legal digital string does not in conformity with the conditions specified by the distributed consensus mechanism, the block S42 is carried out. When the legal digital string is in conformity with the conditions specified by the distributed consensus mechanism, a consensus is reached on the identity authentication result and the legal digital string with the distributed consensus mechanism and the node synchronization mechanism, and the identity authentication result is written and stored into the block of the blockchain.

In detail, compared with the PoW that is a common distributed consensus mechanism, when an IoT gateway obtains the legal digital string required by the PoW, the IoT gateway needs to broadcast the identity authentication result and the legal digital string together within the domain. After receiving the identity authentication result and the legal digital string, each of other IoT gateways determines whether the identity authentication result in the broadcast data packet is the same as the identity authentication result obtained by the respective gateway itself. If the identity authentication result in the broadcast data packet is different from the identity authentication result obtained by the respective gateway itself, the data packet is discarded directly. If the identity authentication result in the broadcast data packet is the same as the identity authentication result obtained by the respective gateway itself, it is determined whether the legal digital string is in conformity with the condition specified by the PoW. Only when the identity authentication result in the broadcast data packet is the same as the identity authentication result obtained by the respective gateway, as well as the legal digital string carried in the broadcast data packet is in conformity with some conditions, the new block generated by the IoT gateway corresponding to the identity authentication result and the legal digital string is approved by the respective gateway and is linked to the blockchain in the domain.

For example, according to the above-mentioned embodiments, the IoT gateways A, B, D, and E receive the identity authentication result and the legal digital string sent by the IoT gateway C, the IoT gateways A, B, D and E verify the identity authentication result and the legal digital string. For example, the IoT gateway A determines whether the identity authentication result sent by the IoT gateway C is the same as the identity authentication result obtained by itself. If the identity authentication result sent by the IoT gateway C is the same as the identity authentication result obtained by itself, the IoT A verifies the legal digital string sent by the IoT C. If the legal digital string sent by the IoT gateway C satisfies some conditions, the IoT gateway C is approved to write the identity authentication result into the block, and the block is stored in the blockchain. Obtaining of the legal digital string is finished. If the IoT gateway A verifies that the identity authentication result sent by IoT gateway C is different from the identity authentication result obtained by the IoT gateway A itself, the identity authentication result is discarded, and the legal digital string is continued to be obtained. After the obtaining is completed, the distributed consensus procedure is initiated. The process can be referred to the above embodiments, which is not repeated herein. If the IoT gateway A verifies that the identity authentication result sent by the IoT gateway C is the same as the identity authentication result obtained by the IoT gateway A itself, but the legal digital string does not meet the requirements, the legal digital string is obtained, and the distributed consensus procedure is initiated after the obtaining of the legal digital string is completed. The process can be referred to the above embodiments, which is not repeated herein. The IoT gateways B, D, and E may perform the verification in the same way, which is not repeated.

It should be noted that when all IoT gateways in the domain verify the identity authentication result and legal digital string, the IoT gateways in the domain may exchange information, and the storage of the blockchain may be synchronized. Consensus can be reached on the identity authentication result and the identity authentication result can be written into the block of the blockchain.

Figure 5:
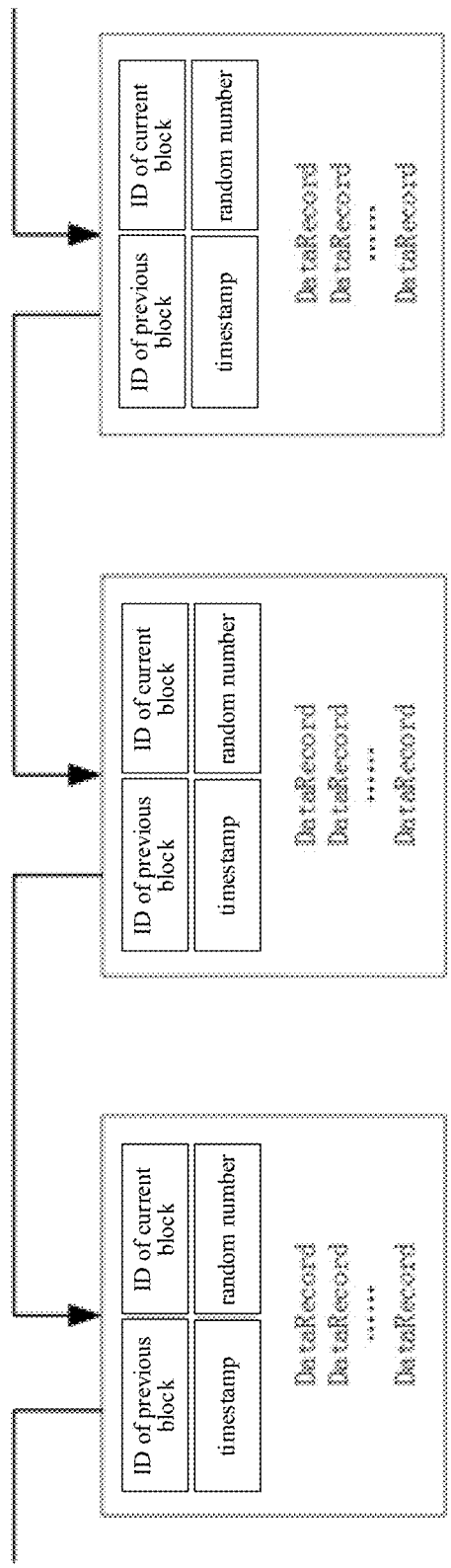
FIG. 5 is a schematic diagram illustrating a blockchain for recording identity authentication results according to an embodiment of the present disclosure.

As illustrated in FIG. 5, a schematic diagram illustrating a blockchain for recording an identity authentication result according to an embodiment of the present disclosure is provided. ID of a previous block, ID of a current block, timestamp, and random number are all inherent contents of the block structure in the conventional blockchain system. The ID of a previous block indicates the ID of a block prior to a current block. The ID of a current block indicates the ID of the current block. The ID of each block is unique throughout the network. The timestamp indicates the time when the block is generated. The random number is a digital string conforming to the PoW regulations and generated by the IoT gateway that generates the block. The DataRecord section is configured to record data records related to the identity authentication. These data records can be network status, host information, and log records of the identity authentication. The data records in the blockchain are open and transparent to the IoT gateway in the domain. In addition, once written into the blockchain, the data records cannot be tampered with.

In block S5, it is determined by the target IoT gateway in the domain whether the identity authentication result exists by scanning the blockchain that is synchronously updated and stored locally through the node synchronization mechanism. When the identity authentication result exists, the identity authentication result is sent to the host. When the identity authentication result does not exist, the scanning is continued.

In detail, during the verification process, the IoT gateway that receives the identity authentication request continuously scans the locally updated and stored blockchain through the node synchronization mechanism. When it is confirmed that the blocks in the blockchain include the authentication result of the identity authentication request, the identity authentication result in the block is fed back to the host that sends the identity authentication request.

It may be understood that different distributed consensus mechanisms and node synchronization mechanisms function differently for generating the blockchains. As a possible implementation, for example, the distributed consensus mechanism of Bitcoin blockchain and the node synchronization mechanism of Bitcoin blockchain may be adopted. When scanning the blockchain, if the block containing the identity authentication result is already on the blockchain and 6 other blocks are linked after this block, it means that the identity authentication result has been approved by most of the gateways in the domain. Therefore, the identity authentication result may be fed back to the foreign gateway that sends the identity authentication request. Otherwise, the blockchain is continuously scanned.

Further, the IoT gateways in the domain may be interconnected to generate the network and share the identity certificates of all legitimate hosts in the domain, thereby overcoming a problem of insufficient security of the access control mechanism based on a single IoT gateway in an existing IoT scenario and having characteristics of high security, transparency, and traceability.

Figure 6:
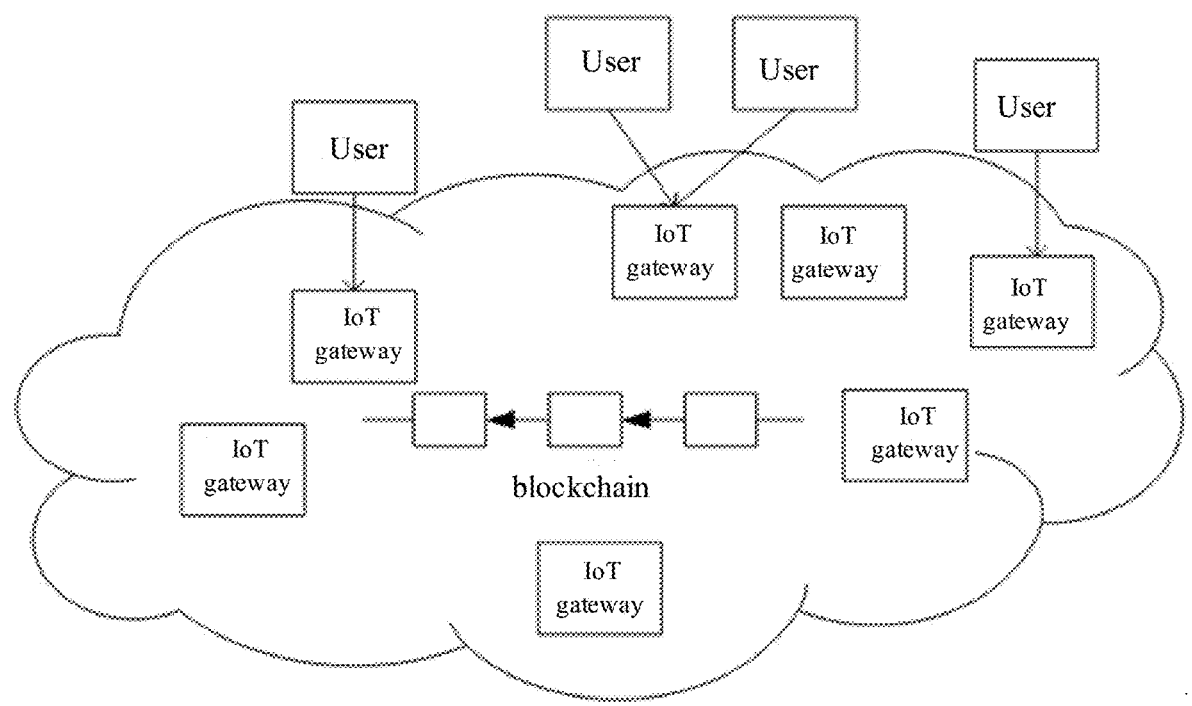
FIG. 6 is a flowchart illustrating a method for cross-domain strong logical isolation and secure access control in the Internet of Things according to a further embodiment of the present disclosure.

As illustrated in FIG. 6, a user (the host) issues the identity authentication request to the IoT gateway. Some IoT gateways in the domain reach a consensus on the identity authentication result through the distributed consensus mechanism and store the identity authentication result in a form of blockchain.

In the above embodiments, the consensus is reached using the PoW mechanism. That is, the IoT gateway generates a series of numbers that are difficult to obtain but easy to verify using a hash algorithm based on a large amount of attempts. The feature "difficult to obtain" means that the IoT gateway usually needs to take a lot of calculations to obtain a qualified digital string. The feature "easy to verify" means that it is easy for another IoT gateway to determine whether this digital string meets a specified condition. In this process, since it requires to keep trying different random numbers, the IoT gateway needs a large amount of computing resources to obtain the qualified string, such that the qualified string may form a new block and the new block may be linked to the blockchain. The greater the workload of the IoT gateway (the longer the computing time and the lager the amount of calculation), the more likely the new blocks is generated, thereby allowing that the hijacker can only tamper with the identity authentication result by hijacking more than 50% of the computing resources. In addition, the block that is successfully linked to the blockchain cannot be tampered with and is publicly open and approved by all IoT gateways.

Figure 7:
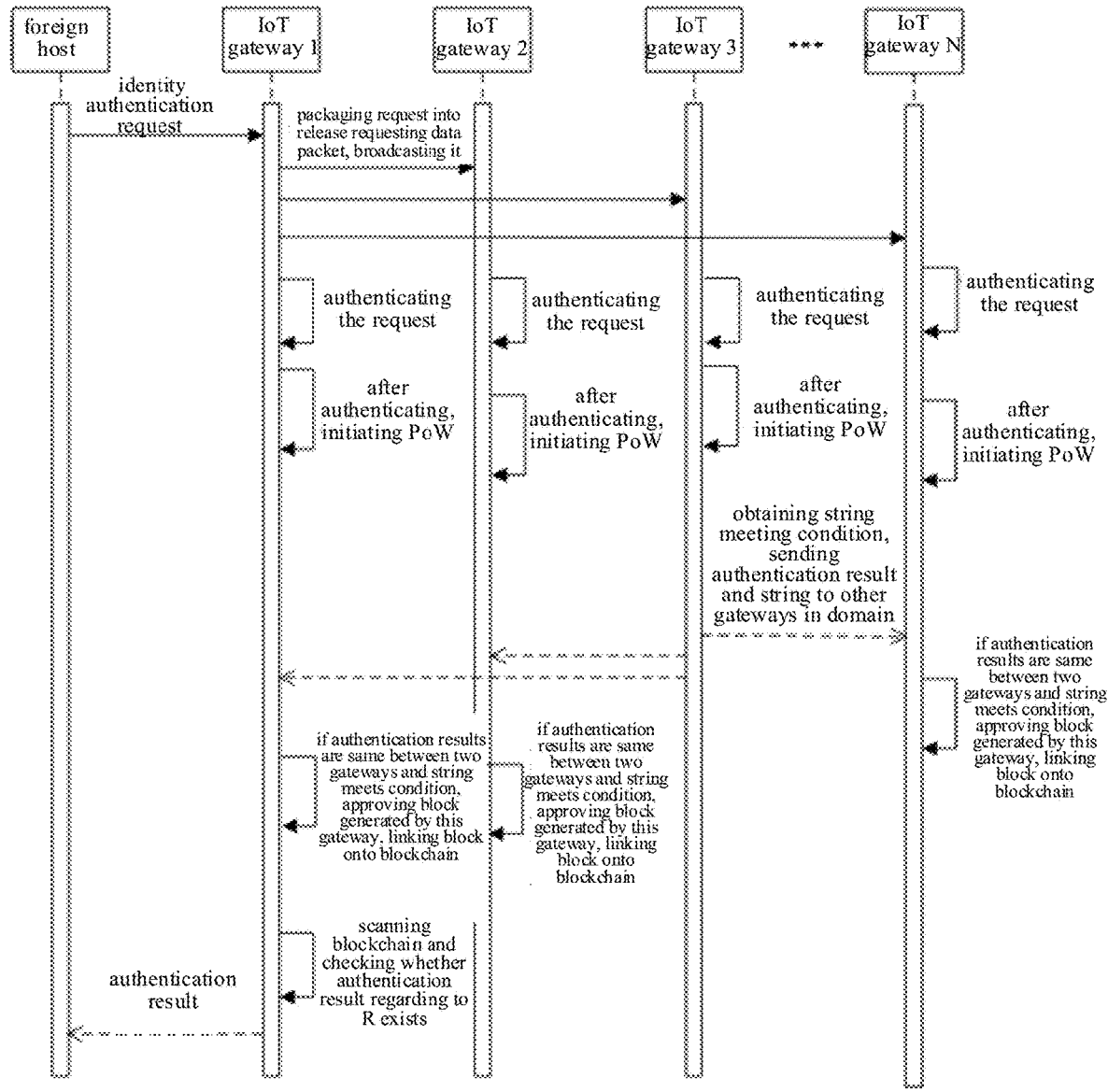
FIG. 7 is a flowchart illustrating a method for cross-domain strong logical isolation and secure access control in the Internet of Things according to a still further embodiment of the present disclosure.

The method for cross-domain strong logical isolation and secure access control in the Internet of Things may be described in detail with reference to an example, For example, as illustrated in FIG. 7, the IoT gateway 1 receives the identity authentication request R sent by the host H. The IoT gateway 1 packages the identity information carried in the identity authentication request R into a release requesting data packet, and sends the release requesting data packet to all IoT gateways in the domain excluding the IoT gateway 1.

After the release requesting data packet is received by an IoT gateway in the domain, the IoT gateway in the domain extracts the identity information carried in the data packet and authenticates the identity information based on the legal identity certificate stored locally.

When the IoT gateway obtains the authentication result, the distributed consensus procedure based on the distributed consensus mechanism is initiated. For example, the IoT gateway adopts the PoW as the distributed consensus mechanism. In a case, the IoT gateway 3 firstly obtains the legal digital string that complies with regulations of the PoW.

After the IoT gateway 3 obtains the legal digital string required by the PoW, this IoT gateway may package the obtained identity authentication result and the legal digital string in the broadcast data packet and send the broadcast data packet to all IoT gateways in the domain excluding the IoT gateway 3. After all other IoT gateways receive the broadcast data packet, each of the other IoT gateways firstly check whether the identity authentication result in the broadcast data packet is the same as the identity authentication result obtained by the respective IoT gateway itself. If the identity authentication result in the broadcast data packet is different from the identity authentication result obtained by the respective IoT gateway itself, the data packet is directly discarded, the respective IoT gateway continues to obtain the digital string and enables the distributed consensus procedure. If the identity authentication result in the broadcast data packet is the same as the identity authentication result obtained by the respective IoT gateway itself, the respective IoT gateway determines whether the digital string meets the condition specified by the PoW. If the digital string does not meet the condition specified by the PoW, the respective IoT gateway continues to obtain the digital string and enables the distributed consensus procedure. Only when the identity authentication result in the broadcast data packet is the same as the identity authentication result obtained by the IoT gateway itself and the digital string carried in the broadcast data packet meets the specified condition, the respective IoT gateway may approve the new block generated by the IoT gateway 3, such that the obtaining of the qualified digital string is stopped. The new block is finally linked to the blockchain in the domain.

In this process, the IoT gateway 1 that receives the identity authentication request keeps scanning the blockchain in the domain. After it is confirmed that a block in the blockchain contains the authentication result of the identity authentication request R, the identity authentication result in the block is fed back to the sender of the identity authentication request R.

According to the above embodiments, the method of cross-domain strong logical isolation and secure access control in the IoT is applicable to the IoT scenario and extend an authentication mode based on a single node in a traditional access control scheme to an authentication mode based on a distribution consensus mechanism by all IoT gateways in the domain. Theoretically, only when more than 50% of the computing resources in the domain are hijacked, the IoT devices in the domain is subjected to security threats. Therefore, cross-domain strong logical isolation is realized and system security is effectively improved.

With the method for cross-domain strong logical isolation and secure access control in the Internet of Things, when one IoT gateway receives the identity authentication request, the IoT gateway sends the identity authentication request to all IoT gateways in the domain excluding that IoT gateway. All IoT gateways in the domain separately perform identity authentication on host that sends the request, and reach a consensus on the identity authentication result through a distributed consensus mechanism. Therefore, the IoT gateways in the domain perform access control with the distributed consensus mechanism, thereby achieving strong cross-domain logical isolation, and effectively improving the security of the IoT system. In addition, the identity authentication result is stored in the form of blocks for easy of retrieval and review, thereby realizing characteristic of open, transparent and traceable.

Further, the device for cross-domain strong logical isolation and secure access control in the Internet of Things according to embodiments of the present disclosure will be described below with reference to drawings.

Figure 8:
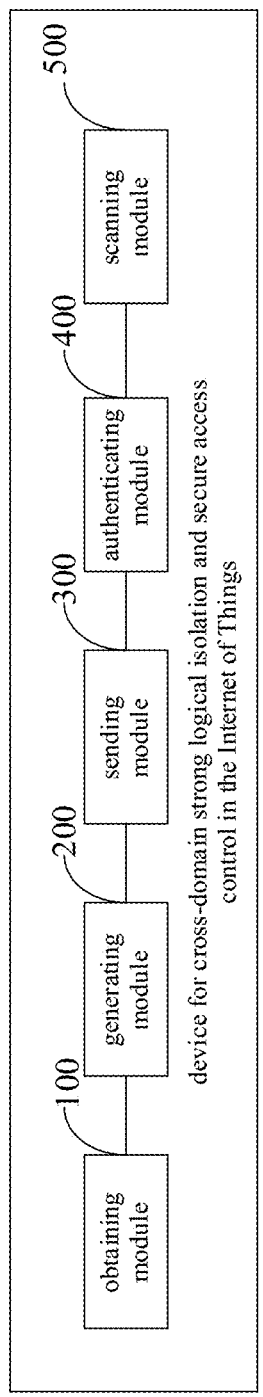
FIG. 8 is a block diagram illustrating a device for cross-domain strong logical isolation and secure access control in the Internet of Things according to an embodiment of the present disclosure.

FIG. 8 is a schematic diagram illustrating a device for cross-domain strong logical isolation and secure access control in the Internet of Things according to an embodiment of the present disclosure.

As illustrated in FIG. 8, the device for cross-domain strong logical isolation and secure access control in the Internet of Things may include an obtaining module 100, a generating module 200, a sending module 300, a verifying module 400 and a scanning module 500.

The obtaining module 100 is configured to receive an identity authentication request from a host outside a domain by a target IoT gateway in the domain, package the identity authentication request into a release requesting data packet, and broadcast the release requesting data packet to all IoT gateways in the domain excluding the target IoT gateway.

The generating module 200 is configured to authenticate the release requesting data packet by all IoT gateways in the domain to generate respective identity authentication results.

The sending module 300 is configured to, once one of the IoT gateways in the domain generates the identity authentication result, initiate a distributed consensus procedure based on a distributed consensus mechanism and obtain a legal digital string that is in conformity with the distributed consensus mechanism, and send the identity authentication result and the legal digital string to other IoT gateways in the domain.

The authenticating module 400 is configured to, when respective IoT gateways in the domain verify the identity authentication result and the legal digital string with the distributed consensus mechanism and a node synchronization mechanism to reach a consensus, write and store the identity authentication result into a block of a blockchain; and The scanning module 500 is configured to, determine whether the identity authentication result exists by scanning, via the target IoT gateway in the domain, the blockchain that is synchronously updated and stored locally through the node synchronization mechanism, send the identity authentication result to the host when the identity authentication result exists, and continue scanning the blockchain when the identity authentication result does not exist.

The device may overcome disadvantages of the authentication scheme based on a single node and has characteristics of high security, transparency and traceability.

Further, the generating module is configured to: once all IoT gateways in the domain receive the release requesting data packet, extract identity information from the release requesting data packet, and authenticate the identity information according to a legal identity certificate stored locally to generate the respective identity authentication results.

Further, the sending module is configured to: once one of the IoT gateways in the domain generates the identity authentication result and before the legal digital string that is in conformity with the distributed consensus mechanism is obtained, if the identity authentication result and the legal digital string are obtained by another IoT gateway in the domain, control the another IoT gateway in the domain to initiate the distributed consensus procedure, and send the identity authentication result and the legal digital string to all IoT gateways in the domain excluding the another IoT gateway.

Further, an identity authentication unit, a calculation unit and a digital string verification unit are included.

The identity authentication unit is configured to, control each IoT gateways in the domain to determine whether the received identity authentication result is the same as the identity authentication result generated by the respective IoT gateway, when the received identity authentication result is different from the identity authentication result generated by the respective IoT gateway, disprove and discard the identity authentication result, and when the received identity authentication result is the same as the authentication result generated by the respective IoT gateway, perform operations by the digital string verification unit.

The calculation unit is configured to obtain the legal digital string that is in conformity with the distributed consensus mechanism, initiate the distribution consensus procedure after the obtaining is completed, send the identity authentication result and the legal digital string of the IoT gateway to all other IoT gateways in the domain, and execute operations by the identity authentication unit.

The digital string verification unit is configured to determine whether the legal digital string meets a condition specified by the distributed consensus mechanism, when it is determined that the legal digital string does not meet the condition specified by the distributed consensus mechanism, execute operations by the calculation unit, when the legal digital string meets the condition specified by the distributed consensus mechanism, reach a consensus on the identity authentication result and the legal digital string through the distributed consensus mechanism and the node synchronization mechanism, write and store the identity authentication result into the ne block of the blockchain.

Further, the node synchronization mechanism is configured to, when all the IoT gateways in the domain verify the identity authentication result and the legal digital string, control the IoT gateways in the domain to exchange information, and synchronous storage is performed on the blockchains.

It should be noted that the foregoing explanation of the embodiment of the method of cross-domain strong logical isolation and secure access control in the Internet of Things is also applicable for the device of this embodiment, and details are not described herein again.

With the device for cross-domain strong logical isolation and secure access control in the Internet of Things, when one IoT gateway receives the identity authentication request, the IoT gateway sends the identity authentication request to all IoT gateways in the domain excluding that IoT gateway. All IoT gateways in the domain separately perform identity authentication on host that sends the request, and reach a consensus on the identity authentication result with a distributed consensus mechanism. Therefore, the IoT gateways in the domain perform access control with the distributed consensus mechanism, thereby achieving cross-domain strong logical isolation, and effectively improving the security of the IoT system. In addition, the identity authentication result is stored in the form of blocks for easy of retrieval and review, thereby realizing characteristic of open, transparent and traceable.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

In the present disclosure, unless specified or limited otherwise, the terms "mounted," "connected," "coupled"

and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the present disclosure.

In the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for cross-domain logical isolation and secure access control in the Internet of Things (IoT), comprising:
    S1, receiving an identity authentication request from a host outside a domain by a target IoT gateway in the domain, packaging the identity authentication request into a release requesting data packet, and broadcasting the release requesting data packet to all IoT gateways in the domain excluding the target IoT gateway;
    S2, authenticating the release requesting data packet by all IoT gateways in the domain to generate respective identity authentication results;
    S3, once a first IoT gateway in the domain generates the identity authentication result, initiating a distributed consensus procedure based on a distributed consensus mechanism such that all IoT gateways in the domain calculate respective legal digital strings that are conformity with the distributed consensus mechanism, in response to determining that both the identity authentication result and the legal digital string are obtained by a second IoT gateway in the domain while other IoT gateways in the domain have not obtained both the identity authentication result and the legal digital string, and sending the identity authentication result and the legal digital string obtained by the second IoT gateway to the other IoT gateways in the domain, wherein the first IoT gateway is the same as or different from the second IoT gateway;
    S4, when respective IoT gateways in the domain reach a consensus by verifying the identity authentication result and the legal digital string with the distributed consensus mechanism and a node synchronization mechanism, writing and storing the identity authentication result into a new block of a blockchain; and
    S5, determining, by the target IoT gateway whether the identity authentication result exists by scanning a blockchain that is synchronously updated and stored locally through the node synchronization mechanism, when the identity authentication result exists, sending the identity authentication result to the host, and when the identity authentication result does not exist, continuing the scanning.

2. The method according to claim 1, wherein authenticating the release requesting data packet by all IoT gateways in the domain to generate respective identity authentication results comprising:
    once the IoT gateways in the domain receive the release requesting data packet, extracting identity information from the release requesting data packet, and authenticating the identity information according to a legal identity certificate stored locally to generate the respective identity authentication results.

3. The method according to claim 1, wherein S4 further comprises:
    S41, when a received identity authentication result is different from an identity authentication result generated by a third IoT gateway of the other IoT gateways, disproving and discarding, by the third IoT gateway, the identity authentication result and executing S42, and when the received identity authentication result is the same as the authentication result generated by the third IoT gateway, executing, by the third IoT gateway, S43;
    S42, obtaining by the third IoT gateway the legal digital string that is in conformity with the distributed consensus mechanism, initiating the distributed consensus procedure after the obtaining of the legal digital string is completed, sending the identity authentication result and the legal digital string of the third IoT gateway to all other IoT gateways in the domain excluding the third IoT gateway, and executing S41; and
    S43, determining, by the third IoT gateway, whether the received legal digital string meets a condition specified by the distributed consensus mechanism, when the received legal digital string does not meet the condition specified by the distributed consensus mechanism, executing S42, and when the received legal digital string meets the condition specified by the distributed consensus mechanism, reaching a consensus on the identity authentication result and the legal digital string through the distributed consensus mechanism and the node synchronization mechanism, writing and storing, by the third IoT gateway, the identity authentication result into the new block of the blockchain.

4. The method according to claim 3, wherein the node synchronization mechanism is configured to, when all IoT gateways in the domain verify the identity authentication result and the legal digital string, control the IoT gateways in the domain to exchange information and perform synchronous storage on the blockchain.

5. A device for cross-domain logical isolation and secure access control in the Internet of Things (IoT), comprising:
a processor, and
a memory, configured to store instructions thereon,
wherein when the instructions are executed by the processor, the processor is configured to:
when receiving an identity authentication request from a host outside the domain, control a target IoT gateway in the domain to package the identity authentication request into a release requesting data packet, and broadcast the release requesting data packet to all IoT gateways in the domain excluding the target IoT gateway;
control each IoT gateway in the domain to authenticate the release requesting data packet to generate a respective identity authentication result;
once generating the identity authentication result by a first IoT gateway in the domain, control the first IoT gateway to initiate a distributed consensus procedure based on a distributed consensus mechanism such that all IoT gateways in the domain calculate respective legal digital strings that are conformity with the distributed consensus mechanism, in response to determining that both the identity authentication result and the legal digital string are obtained by a second IoT gateway in the domain while other IoT gateways in the domain have not obtained both the identity authentication result and the legal digital string, and send the identity authentication result and the legal digital string obtained by the second IoT gateway to the other IoT gateways in the domain, wherein the first IoT gateway is the same as or different from the second IoT gateway;
when respective IoT gateways in the domain reach a consensus by verifying the identity authentication result and the legal digital string through the distributed consensus mechanism and a node synchronization mechanism, control the respective IoT gateways to write and store the identity authentication result into a new block of a blockchain; and
control the target IoT gateway to determine whether the identity authentication result exists by scanning a blockchain that is synchronously updated and stored locally through the node synchronization mechanism, when the identity authentication result exists, send the identity authentication result to the host, and when the identity authentication result does not exist, continue the scanning.

6. The device according to claim 5, wherein the processor is configured to control each IoT gateway in the domain is configured to authenticate the release requesting data packet to generate the respective identity authentication result by:
after the IoT gateways in the domain receives the release requesting data packet, extracting identity information from the release requesting data packet, and authenticating the identity information according to a legal identity certificate stored locally to generate the respective identity authentication result.

7. The device according to claim 5, wherein the processor is further configured to control a third IoT gateway of the other IoT gateways to:
S41, when a received identity authentication result is different from an identity authentication result generated by the third IoT gateway, disprove and discard the identity authentication result and execute S42, and when the received identity authentication result is the same as the authentication result generated by the third IoT gateway, execute S43;
S42, obtain the legal digital string that is in conformity with the distributed consensus mechanism, initiate the distributed consensus procedure after the obtaining of the legal digital string is completed, send the identity authentication result and the legal digital string of the respective IoT gateway to all other IoT gateways in the domain excluding the third IoT gateway, and execute S41; and
S43, determining whether the received legal digital string meets a condition specified by the distributed consensus mechanism, when the received legal digital string does not meet the condition specified by the distributed consensus mechanism, execute S42, and when the received legal digital string meets the condition specified by the distributed consensus mechanism, reach a consensus on the identity authentication result and the legal digital string through the distributed consensus mechanism and the node synchronization mechanism, write and store the identity authentication result into the new block of the blockchain.

8. The device according to claim 5, wherein the node synchronization mechanism is configured to, when all IoT gateways in the domain verify the identity authentication result and the legal digital string, control all blockchains of IoT gates in the domain to exchange information and perform synchronous storage on the blockchain.

9. A non-transitory computer readable storage medium, having instructions stored thereon, wherein when the instructions are executed by a processor, a method for cross-domain logical isolation and secure access control in the Internet of Things (IoT) is executed, wherein the method comprises:
S1, receiving an identity authentication request from a host outside a domain by a target IoT gateway in the domain, packaging the identity authentication request into a release requesting data packet, and broadcasting the release requesting data packet to all IoT gateways in the domain excluding the target IoT gateway;
S2, authenticating the release requesting data packet by all IoT gateways in the domain to generate respective identity authentication results;
S3, once a first IoT gateway in the domain generates the identity authentication result, initiating a distributed consensus procedure based on a distributed consensus mechanism such that all IoT gateways in the domain calculate respective legal digital strings that are conformity with the distributed consensus mechanism, in response to determining that both the identity authentication result and the legal digital string are obtained by a second IoT gateway in the domain while other IoT gateways in the domain have not obtained both the identity authentication result and the legal digital string, and sending the identity authentication result and the legal digital string obtained by the second IoT gateway to the other IoT gateways in the domain, wherein the first IoT gateway is the same as or different from the second IoT gateway;
S4, when respective IoT gateways in the domain reach a consensus by verifying the identity authentication result and the legal digital string through the distributed consensus mechanism and a node synchronization mechanism, writing and storing the identity authentication result into a new block of a blockchain; and S5, determining, by the target IoT gateway whether the identity authentication result exists by scanning a blockchain that is synchronously updated and stored locally through the node synchronization mechanism, when the identity authentication result exists, sending the identity authentication result to the host, and when the identity authentication result does not exist, continuing the scanning.

10. The non-transitory computer readable storage medium according to claim 9, wherein authenticating the release requesting data packet by all IoT gateways in the domain to generate respective identity authentication results comprising:

after the IoT gateways in the domain receive the release requesting data packet, extracting identity information from the release requesting data packet, and authenticating the identity information according to a legal identity certificate stored locally to generate the respective identity authentication results.

11. The non-transitory computer-readable storage medium according to claim 9, wherein S4 further comprises:

S41, when a received identity authentication result is different from an identity authentication result generated by a third IoT gateway of the other IoT gateways, disproving and discarding, by the third IoT gateway the identity authentication result and executing S42, and when the received identity authentication result is the same as the authentication result generated by the third IoT gateway, executing, by the third IoT gateway, S43;

S42, obtaining, by the third IoT gateway, the legal digital string that is in conformity with the distributed consensus mechanism, initiating the distributed consensus procedure after the obtaining of the legal digital string is completed, sending the identity authentication result and the legal digital string of the third IoT gateway to all other IoT gateways in the domain excluding the third IoT gateway, and executing S41; and S43, determining, by the third IoT gateway, whether the received legal digital string meets a condition specified by the distributed consensus mechanism, when the received legal digital string does not meet the condition specified by the distributed consensus mechanism, executing S42, and when the received legal digital string meets the condition specified by the distributed consensus mechanism, reaching a consensus on the identity authentication result and the legal digital string through the distributed consensus mechanism and the node synchronization mechanism, writing and storing, by the third IoT gateway, the identity authentication result into the new block of the blockchain.

12. The non-transitory computer readable storage medium according to claim 9, wherein the node synchronization mechanism is configured to, when all IoT gateways in the domain verify the identity authentication result and the legal digital string, control all blockchains of IoT gates in the domain to exchange information and perform synchronous storage on the blockchain.

\* \* \* \* \*